Feb. 11, 1958 — L. F. THIRY — 2,823,054
FLANGED RESILIENT JOINT
Filed Feb. 17, 1954

INVENTOR.
LEON F. THIRY
BY Fay & Fay
ATTORNEYS

United States Patent Office 2,823,054
Patented Feb. 11, 1958

2,823,054

FLANGED RESILIENT JOINT

Leon F. Thiry, Chagrin Falls, Ohio

Application February 17, 1954, Serial No. 410,875

4 Claims. (Cl. 287—85)

This invention relates to resilient or flexible joints of the type in which an intermediate annular bushing of rubberlike material interconnects rigid inner and outer sleeve members. More particularly it concerns flanged joints of this type wherein the portion of the rubber bushing fitted between the rigid members adheres to such members in pressure friction engagement resulting from inward and outward radial deformation of the free state rubber and the axial elongation thereof.

In joints of this type the portion of the bushing inserted between the inner and outer members is in a state of very considerable radial compression and possesses superior characteristics with respect to the capacity to resist radial and oscillating loads without the deterioration and wear common in bushings wherein the rubber is bonded to one or both surfaces of the sleeve members.

An object of this invention is to provide a design for a rubber bushing adapted to be disposed between inner and outer concentric rigid members which will lend itself to an economic molding arrangement, and which will provide an increased degree of flexibility for the insert designer in determining dimensions which will achieve improvements in specific characteristics and in over-all bushing performance.

Another object is to provide a design for such an insert which will permit the insert to be assembled within the inner and outer sleeves in the presence of a suitable lubricant without the necessity of locking the assembled unit in place for such a period of time as may be involved in expelling or dissipating or absorbing the lubricant film in order to avoid accidental disassembly of the elements.

Still another object of the invention is to provide a design which will minimize in the area of the critical flange zone the disassociation characteristics inherent in deforming rubber around a radius and under high radial compression between the inner and outer members.

It will be apparent that in a flanged bushing of the type described at the moment of assembly when the bushing has been inserted between the inner and outer members in the presence of a lubricant, a critical stress condition exists. The body or cylindrical portions of the bushing have been reduced in outer diameter and expanded in internal diameter, whereas the flanged portion of the bushing has not been radially compressed. Hence, in the area connecting the flanged and body portions of the bushing a non-uniformity of stress develops which would promote quick disassociation of the rubber from the outer sleeve. It is therefore a major concern of this invention to provide a design which will eliminate the problem of accidental disassociation at the critical time immediately following assembly and thus lend itself to production on automatic equipment capable of assembling bushing elements of this type at a very high rate per hour.

Other objects and advantages will become apparent hereinafter when the following specification is read in conjunction with the accompanying drawing, in which.

Figure 1:
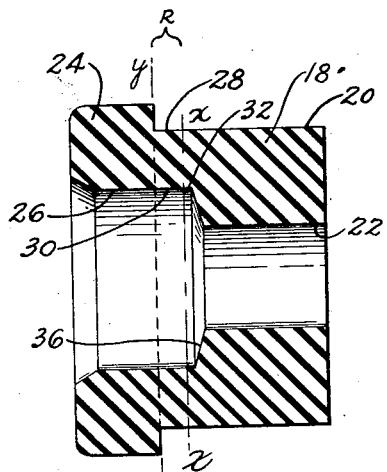
Fig. 1 is a view in longitudinal cross section of the rubber insert in the invention in its free state.

Referring now to the drawings, a flanged rubber insert is shown between an outer sleeve 10, having an outer surface 10a and an inner surface 10b, and an inner rigid member or sleeve 12, having an outer surface 12a and an inner surface 12b. One end of the outer sleeve 10 is shown with a radial flange 14 having an inner radius 16 in contact with the flanged portion of the rubber bushing. While the outer member 10 has been shown in the drawings with an integral radially extending flange 14, it will be understood that the flange provides an abutment surface against which the flange of the rubber bushing engages.

In Fig. 1 is shown the rubber insert in its free state, i. e., before it has been assembled between the inner and outer sleeves. The bushing element of rubberlike material has a body portion 18 which has an outer surface 20 and an inner surface 22. At the opposite end of the bushing is a flange 24 having an inner surface 26. Interconnecting the flange portion 24 and the body portion 18 of the bushing is a neck portion R, which is that portion of the bushing lying between the dotted line y—y and the dot-dash line x—x. This neck portion has an outer surface 28 and an inner surface 30. Inward of this neck portion is a safety zone having an inner surface 32 which is substantially equal in diameter to that of the inner surface 26 of the flange portion and the surface 30 of the neck portion. The tapered surface 36 interconnects the surface 32 and the inner surface of the body portion 22, although it will be apparent that this surface need not be tapered. The letter W shown in Fig. 2 refers to the theoretical center of an arc forming the curved surface 16 of the flange 14.

Figure 2:
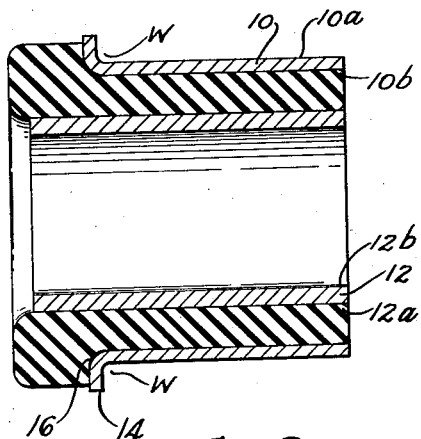
Fig. 2 is a view in longitudinal cross section of one form of the improved flexible joint showing the rubber insert of Fig. 1 assembled between inner and outer members.

The nature of this invention may be observed by a comparison of the form of the free state rubber bushing shown in Fig. 1 and the form it takes when assembled between inner and outer members as in Fig. 2. The inner surfaces of the flange and neck portions of the free state bushing, i. e., the surfaces 26, 30 and 32, have a lesser diameter than the outer surface of the inner member 12. The outer surfaces 20 and 28 of the body and neck portions of the bushing in the free state have a greater diameter than the inner diameter of the outer sleeve 10. In view of these proportions it wil be obvious that a very considerable deformation of the rubber takes place during assembly.

In the conventional practice for assembling bushings of this general type, the rubber insert is first forced into the outer member bringing the flanged portion 24 into engagement with the adjacent abutment surface of the rigid flange 14. This assembly is done in the presence of a suitable lubricant to facilitate insertion. Immediately following this first assembly operation and almost simultaneously therewith by means of a tapered punch or through other suitable practices familiar in the art, the inner rigid member 12 is forced in the presence of a lubricant within the aperture of the rubber bushing. The introduction of the inner member 12 into the bushing dilates the inner surface 26 of the flange portion, the surfaces 30 and 32 of the neck and safety portions, and the surface 22 of the body portion. Since the outer surfaces 28 and 20 of the neck and body portions are restrained from outward expansion by reason of the presence of the outer sleeve 10, the body portion compensates for the reduction in annular wall sectional area between the sleeves and is therefore axially elongated.

A further comparison of the form of the free state and assembled rubber bushing elements brings out the fact that the outer surfaces 28 and 20 of the neck and body portions of the bushing have been radially reduced so that not only have the inner surfaces of the bushing 26, 30, 32 and 22 been circumferentially expanded but the outer surfaces 28 and 20 have been radially reduced, thus producing in the assembled insert a state of extreme radial compression.

A surprising feature of the design and assembly described above is that, if the bushing has been properly proportioned in accordance with the teaching herein described and if a proper lubricant has been used, no disassembly at the critical time of assembly will take place. It will be apparent that at this critical assembly time there is an expelling force of the rubber in the flange zone or area against particularly the curved surface 16 of the rigid flange element but, because of the design of the bushing as herein set forth, these dispelling forces are rendered impotent. Heretofore it has not been possible with the insert designs known in the art to produce an assembled bushing which did not have disassociation characteristics in the moments following assembly and when there was present a substantial opening of the inner diameter of the flange and/or a substantial closing of the outer diameter of the non-flanged portion of the bushing without recourse to some pressure relief means on the exterior of the bushing, such as a cut or a groove. It has been thought necessary in bushings of this type to completely eliminate any stress in the connecting zone between the flange and body of the bushing. I have discovered, however, that by deepening the counterbore which is, in effect, the combined surfaces 26 and 30 referred to above and carrying the counterbore well into the body of the bushing instead of terminating the counterbore at the line y—y as had heretofore been necessary in bushings of this type, the disassociation tendency of the bushing after assembly has been rendered impotent. If an extra margin of assurance is desired with respect to disassociation, the further extension of the counterbore represented by the surface 32 may be utilized since it is frequently difficult to determine in advance an exact width for the neck portion.

The provision of the neck portion in a bushing of this type leads to certain highly desirable advantages in other respects. Previously in a counterbore flanged bushing it was thought that a substantial dilation of the inner surface of the flanged portion of the bushing or a substantial closing or radial reduction of the outer surface of the non-flanged portion of the bushing might, in some instances, lead to a tendency to pop off or to disassociate the elements of the bushing one from the others at the time immediately following assembly. It has been found highly desirable, however, in certain circumstances, that a substantial dilation of the inner surface of the flange should take place since this provides a firm grip for this portion of the bushing upon the inner member to resist wear and to permit oscillation of the bushing during operation of the joint. It is also highly desirable to have, in many instances, substantial reduction in the outer diameter of the bushing in order to facilitate assembly by permitting the use of a bore in the rubber which will be larger than would have been possible if the entire reduction in wall thickness in the body of the bushing had to be achieved only or primarily through the opening of the inner diameter.

Figure 3:
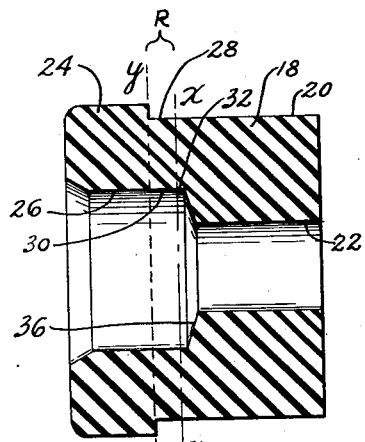
Figs. 3 and 4 are views similar to Figs. 1 and 2 illustrating a form of the insert and joint when a greater amount of wall compression in the body portion is sought.
Figures 4, 5:
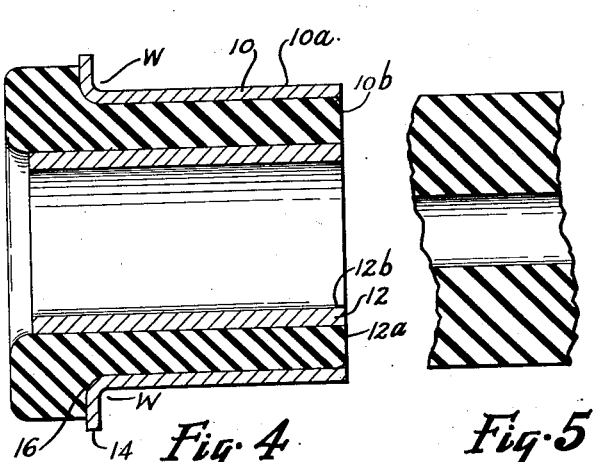
Fig. 5 is a fragmentary view in cross section of the body portion of a free state insert showing the relative inner and outer diameters required if wall compression is to be achieved only by dilation of the bore.

It has been recognized in this art that for proper life, resistance to wear, and for load characteristics, a wall compression of not less than 40 percent, sometimes preferably at least 50 percent, and perhaps in some instances even considerably higher should be obtained. In Figs. 3 and 4, illustration is made of a bushing where a greater degree of wall compression is obtained than in Figs. 1 and 2. Some of this wall compression has been obtained by a reduction in the outer diameter of the body of the bushing and considerably more by an increase in the inner diameter of the body of the bushing.

In Fig. 5 is shown a comparison of the form the rubber insert would have had to take if all of the wall compression were obtained by opening of the inner diameter of the body of the bushing. It will be seen that the bore of the bushing in which all of the wall compression is obtained by opening is smaller than the bore of a bushing where the compression has been obtained by a combination of both opening and closing. The fact that a greater bore is obtainable when closing is utilized permits the use of shorter punches in the assembly operation which facilitates assembly and eliminates the necessity for the terrific amount of circular opening that would otherwise be necessary.

Experience with this bushing has brought out the fact that in order to obtain suitable wall compression the relationship of reduction of the outer diameter of the outer portion of the body of the bushing to the increase or expansion of the inner diameter should not be more than about 1 to 3, and may, of course, be less as in the order of 1 to 4 or 1 to 5, depending on the particular characteristics desired for a specific application. Another important advantage which this bushing has is that it allows a designer a considerable flexibility in his design in that, for example, he may vary the amount of opening in the flange portion or in the neck portion and may also vary the degree of closing to be obtained on the outer surfaces of the neck and body portions. Such flexibility has not heretofore been available to the degree now possible through this invention because of the problems of disassembly.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A flexible mounting comprising an outer member providing an outer surface of revolution; an inner member within the outer member providing an inner surface of revolution coaxial with but spaced radially inwardly from the outer surface; an annular surface around the outer member at one end of the outer surface extending in a plane transverse to the axis of the surfaces, said annular surface being spaced axially inwardly of the corresponding end of said inner member; an insert bushing of rubberlike material having a radial flange portion engaging said annular surface and exerting radial pressure upon said inner member axially outward of said annular surface, and having a body portion between said inner and outer surfaces in pressure friction engagement therewith, and having an integral neck portion between said flange and body portions and with said neck portion exerting pressure radially against confronting portions of said inner and outer surfaces; said insert before deformation comprising in portions thereof corresponding to the aforementioned portions of the assembled insert, a body portion, the inner and outer diameters of which are respectively smaller and greater than the diameters of the said inner and outer surfaces of revolution, whereby after assembly the inner surface of the body portion of the bushing is materially stressed and radially expanded and the outer surface of the body portion of the bushing is radially reduced and whereby after assembly the body portion is compensatorally axially elongated; a flange portion, the inner diameter of which is greater than the inner diameter of the body portion but less than the diameter of the said inner surface of revolution; and a neck portion between said flange and body portions, the inner diameter of which is substantially equal to the inner diameter of the flange portion and the outer diameter of which is substantially equal to the outer diameter of the body portion.

2. A resilient joint comprising spaced inner and outer concentric rigid members, said outer rigid member having a radial outward flange at one end thereof, said flange being spaced axially inwardly of the corresponding end of said inner member, and an insert bushing of rubberlike material having a body portion between said rigid members in pressure friction engagement therewith and having a radial flange portion engaging said flange end of said outer member and adhering to said inner member in pressure friction engagement, said bushing in its free state having: an end portion adapted to become upon assembly the said radial flange portion of the insert bushing, the inner diameter of the said end portion being less than the outer diameter of the inner member; a body portion, the outer diameter of which is greater than the inner diameter of the outer member and the inner diameter of which is less than the outer diameter of the inner member; and an extended neck portion between said end and body portions having an outer diameter substantially equal to the outer diameter of the body portion and greater than the inner diameter of the outer member and having an annular wall sectional area less than the annular wall sectional area of the said end portion, and greater than the annular wall sectional area between said inner and outer members when the joint is assembled, and substantially less than the annular wall sectional area of the free state body portion of the bushing.

3. A flexible mounting as defined in claim 1 in which the insert bushing is further characterized by having the inner surface of the body portion of the bushing radially expanded and the outer surface of the body portion of the bushing radially reduced in a ratio not greater than 3 to 1.

4. A resilient joint as defined in claim 2, being further characterized by having in the assembled state not less than 40 percent wall compression of the body portion of the bushing.

References Cited in the file of this patent

UNITED STATES PATENTS

| | | |
|---|---|---|
| 2,598,115 | Dodge | May 27, 1952 |
| 2,661,969 | Thiry | Dec. 8, 1953 |

FOREIGN PATENTS

| | | |
|---|---|---|
| 944,459 | France | Nov. 2, 1948 |